United States Patent [19]

Itomitsu et al.

[11] Patent Number: 5,509,137
[45] Date of Patent: Apr. 16, 1996

[54] STORE PROCESSING METHOD IN A PIPELINED CACHE MEMORY

[75] Inventors: Fujio Itomitsu; Yuuichi Saito, both of Itami, Japan

[73] Assignee: Mitsubishi Denki Kabushiki Kaisha, Japan

[21] Appl. No.: 210,106

[22] Filed: Mar. 16, 1994

Related U.S. Application Data

[63] Continuation of Ser. No. 718,125, Jun. 20, 1991, abandoned.

[30] Foreign Application Priority Data

Jan. 8, 1991 [JP] Japan ................................. 3-000467

[51] Int. Cl.⁶ ................................................. G06F 12/06
[52] U.S. Cl. ........................... 395/495; 395/415; 395/472; 395/473; 364/DIG. 1
[58] Field of Search ................................ 395/415, 472, 395/473, 495

[56] References Cited

U.S. PATENT DOCUMENTS

| | | | |
|---|---|---|---|
| 5,014,195 | 5/1991 | Farrell et al. | 364/200 |
| 5,047,920 | 9/1991 | Funabashi | 395/425 |
| 5,073,851 | 12/1991 | Masterson et al. | 395/425 |
| 5,095,424 | 3/1992 | Woffinden et al. | 395/425 |
| 5,111,386 | 5/1992 | Fujishima et al. | 395/425 |
| 5,148,536 | 9/1992 | Witek et al. | 395/425 |
| 5,163,142 | 11/1992 | Mageau | 395/425 |

OTHER PUBLICATIONS

"CMOS Design for Super LSI", p. 181, 5.29 Apr. 25, 1989.

Primary Examiner—Reba I. Elmore
Attorney, Agent, or Firm—Townsend and Townsend and Crew

[57] ABSTRACT

A cache memory apparatus and microprocessor therewith has a first address register for a tag memory and a second address register for a data memory, a tag entry decoder and a data entry decoder. Lower order bits of the contents stored in the first address register are transferred to the second address register through a transferring path in a write operation. Tag comparison and a data write of a result of the preceding comparison are executed in parallel in the same clock period, and thereby speed of processing is higher in the case of consecutive write operations at a write hit.

10 Claims, 9 Drawing Sheets

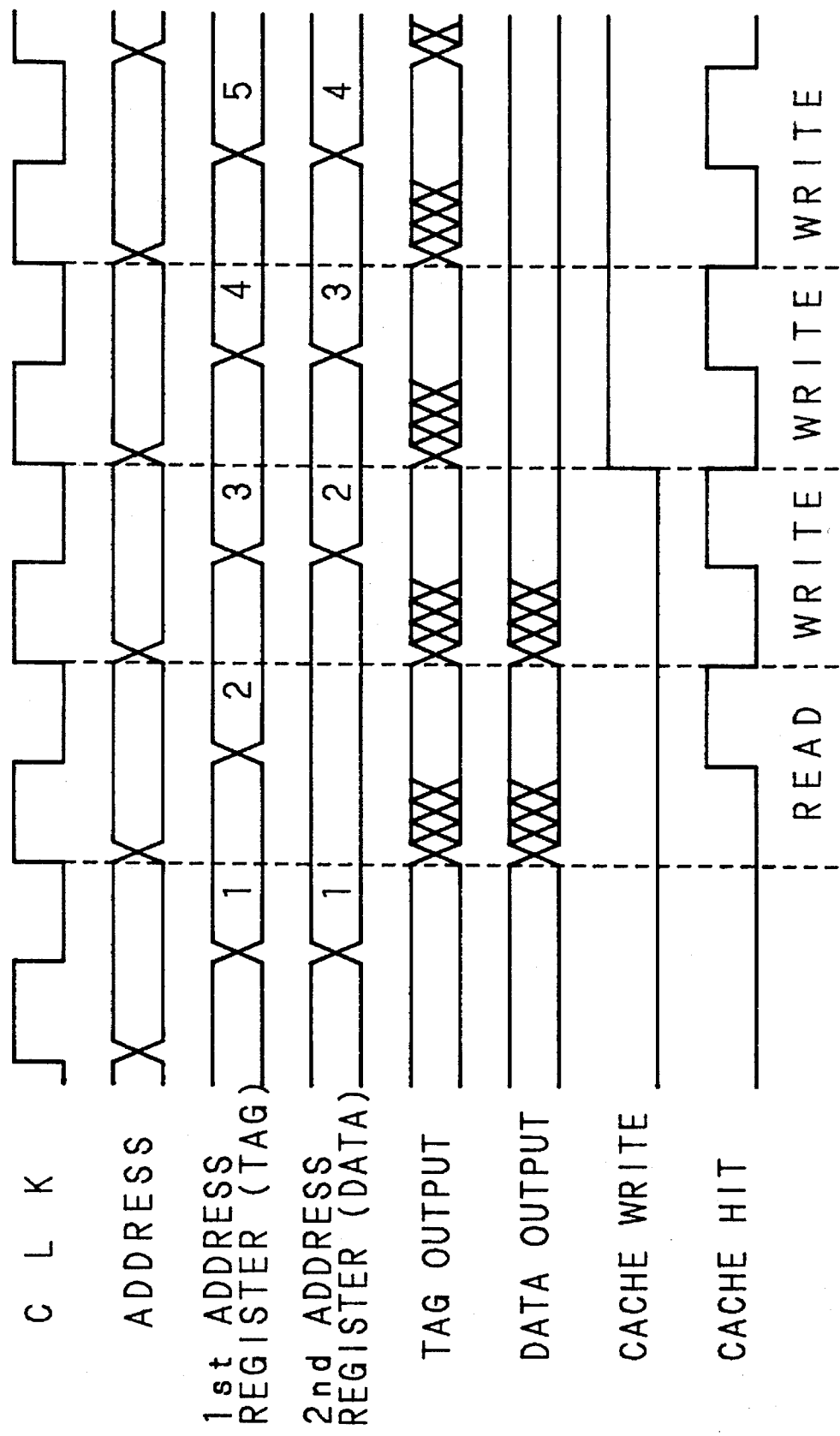

STORE PROCESSING METHOD IN A PIPELINED CACHE MEMORY

This is a continuation of application Ser. No. 07/718,125, filed Jun. 20, 1991, now abandoned.

BACKGROUND OF THE INVENTION

1. Field of the Invention

The present invention relates to a cache memory apparatus and a microprocessor having a cache memory apparatus, and specifically relates to a technique for raising the speed of operation of writing data to a data cache memory.

2. Description of Related Art

A cache memory built in a microprocessor preliminarily stores data and instructions to be used frequently among data and instructions in a main memory, and makes a Central Processing Unit (CPU) accessible to these data and instructions at high speed. The cache memory built in the microprocessor includes a data cache memory (hereinafter abbreviated as data cache) and an instruction cache memory (hereinafter abbreviated as instruction cache). The cache memory is composed of a tag memory storing addresses as tag information, where data and instructions in the main memory are located and a data memory storing data and instructions corresponding to the tag information. The operation of the instruction cache including reading of a tag, tag comparison and judgment of hit or miss. In the case of a hit, the instruction corresponding to the tag is read. In the case of a miss, a re-register of the instruction from the main memory is performed. The operation of the data cache includes reading a tag, tag comparison and inversion of hit and miss. In case of a hit, a data read or data write of the data corresponding to the tag is performed. In the case of a miss, a re-register of the data from the main memory is performed.

The following provides a description of a configuration of a cache memory apparatus built in a conventional microprocessor according to the block diagram of FIG. 1.

In FIG. 1, numeral 101 designates an address register. When a new address is inputted to the address register 101 through an address bus (not illustrated), this address register 101 temporarily stores it. The number of rows selected int he lower-order part of the address is called the number of entries. This lower-order part of address is inputted to an entry decoder 103 which is installed in common in a data memory 106 and a tag memory 104. The entry decoder 103 selects entries of the tag memory 104 and the data memory 106 by decoding the lower-order part of address. The higher-order part of address is given to the tag memory 104 or to a comparator 107. Tag information in the tag memory 104 of the selected entry is also given to the comparator, and the tag information is compared with the higher-order part of the inputted address. The result of this comparison is given to a gate 108 to determine (1) whether or not the information outputted from the selected entry of the data memory 106 is to be outputted to a processing unit (not illustrated) as effective data or (2) whether or not the data from the processing unit is to be written to the selected data memory 106.

The conventional cache memory apparatus composed as described above operates as follows. The conventional cache memory decodes the lower-order part of an address in the entry decoder 103 in synchronism with a clock period and selects an entry in the tag memory 104. Tag information is read out from the selected entry of the tag memory 104 during the above-mentioned clock period. The read-out tag information is compared with the higher-order part of the inputted address by the comparator 107, and where these values coincide each other, it is said that the cache has hit, and a hit signal is generated. Also, where these values do not coincide each other, it is said that the cache has missed. Particularly, in the case of write operation, the cache hit is called write hit and the cache miss is called write miss.

FIG. 2 is a timing chart of a write operation of a conventional data cache. In a data cache write operation, when the cache has a hit (write hit) as a result of the tag comparison, data is written to the data memory 106 of the entry corresponding to the tag information. This means that read-out and comparison of the tag are performed and a hit signal is generated in synchronism with one clock period. In the next clock period next, data write to the data memory 106 of the row corresponding to the hit tag information is performed through the gate 108. In one example, in FIG. 1, tag information is read out from, e.g., the third row (the third entry) of the tag memory 104 in one clock period. This compared with the higher-order part of the address by the comparator 107, and, as a result, the hit signal becomes active. Then, the data is written to the third row (the third entry) of the data memory 104 in the next clock period. Data write cannot be performed in the data memory 106, while the tag information is read out from the tag memory 104. Also, while the data is written to the data memory 106.

As described above, a write operation of the conventional built-in cache memory, as shown in FIG. 2, necessitates a total of two clocks; one clock for read of tag information and tag comparison and one clock for re-write of the data corresponding to the above-mentioned tag information. Accordingly, there has been a problem that when write hits take place consecutively, two clock are required all the time, and thereby data access is delayed.

In general, the cache memory is used for sending and receiving data between an external memory device and a microprocessor at a high speed. In the case where the cache memory is located outside the microprocessor, because of delays between these units, a number of cycles are required also for data transfer from the cache memory to the microprocessor in comparison with the time of internal processing of the microprocessor. Accordingly, even when write operations are performed consecutively, the delay of the cache memory does not affect the whole functions very much. But in the case where the cache memory is built in the microprocessor, the delay required for data transfer from the cache memory to the microprocessor is small, and therefore the delay required for internal processing of the cache memory reduces the operating speed of the microprocessor and causes a reduction in speed of the whole function.

SUMMARY OF THE INVENTION

The present invention has been achieved in consideration of such circumstances, and the primary object of the present invention is to provide a cache memory apparatus which can perform write operations consecutively and can perform a high-speed write operation when write-hits take place consecutively by installing entry decoders separately for tags and data to make tag comparisons overlap with data writes.

Another object of the present invention is to provide a microprocessor which can perform a high-speed operation by using the above-mentioned cache memory apparatus for a data cache in a microprocessor.

In the present invention, in a read operation, storage addresses are stored simultaneously into a first address register and a second address register, and the same entry is selected in a first entry decoder and a second entry decoder. When the results of comparison coincide, information of a data memory of the selected entry is read out. On the other hand, in a write operation, storage addresses are stored only in the first address register, and a comparison is taken by a comparator. When the results of comparison coincide, part of the storage addresses stored into the first address register is transferred to the second address register. The first address register, in storing the next storage addresses, outputs part of the next storage addresses to the first entry decoder. Simultaneously, the second address register outputs, to the second entry decoder, parts of the storage addresses which was transferred previously. Accordingly, different entries are selected in the tag memory and the data memory, and thereby data write and comparison of tag information can be performed on the same cycle, and thereby the speed of write operation can be made higher.

The above and further objects and features of the invention will more fully be apparent from the following detailed description with accompanying drawings.

BRIEF DESCRIPTION OF THE DRAWINGS

FIG. 9 is a timing chart showing access operation of the data cache of the microprocessor having the built-in data cache of the present invention.

DESCRIPTION OF THE PREFERRED EMBODIMENT

Figure 1:
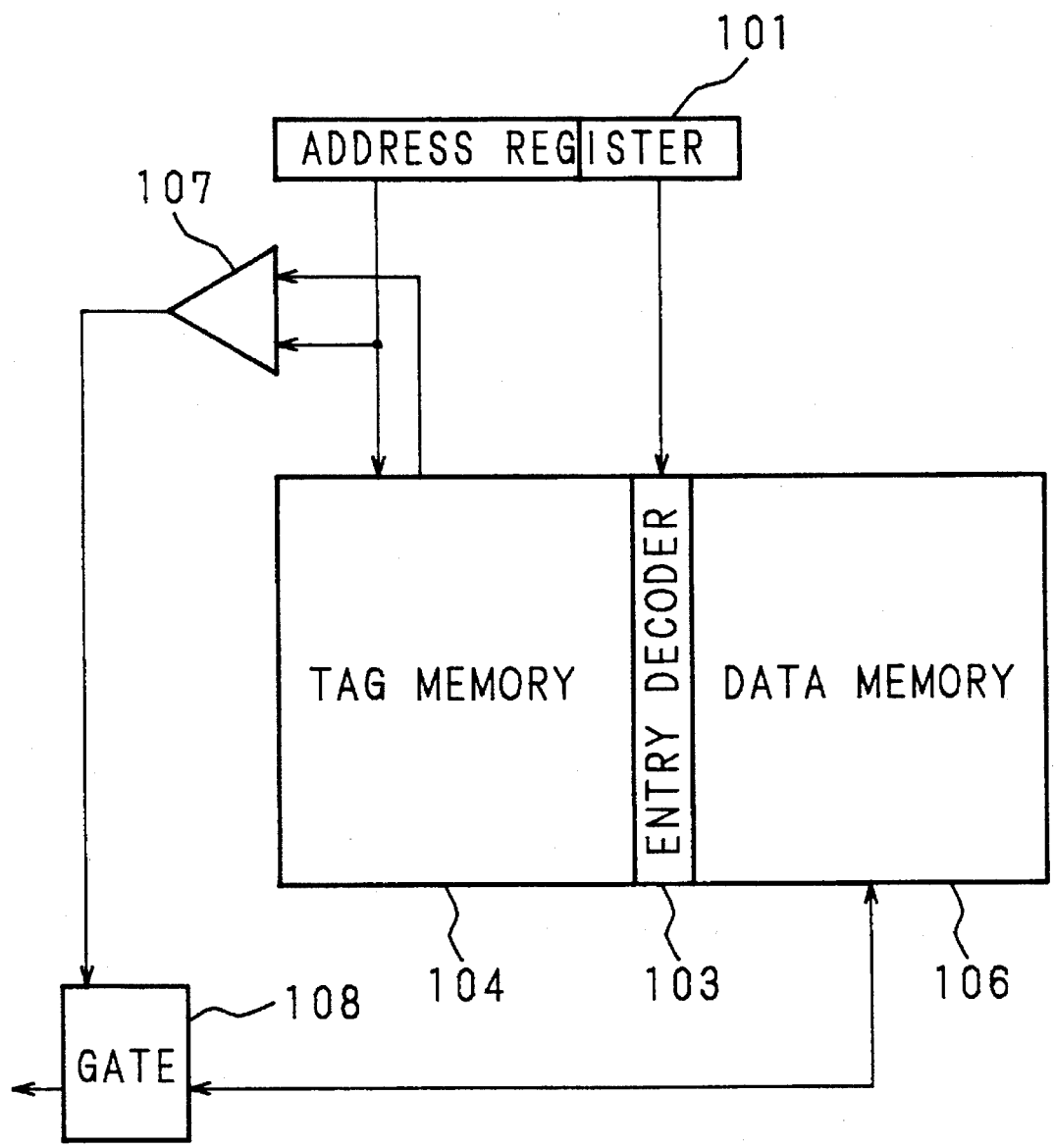
FIG. 1 is a block diagram showing a configuration of a conventional cache memory.
Figure 2:
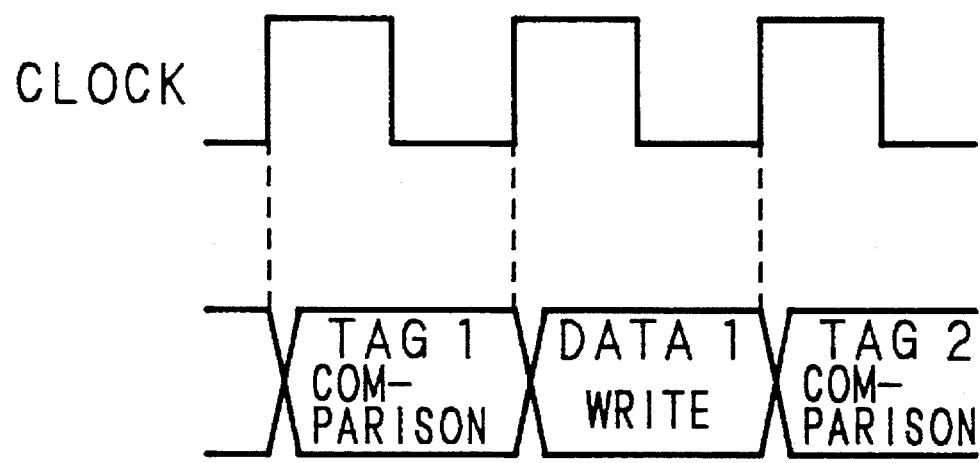
FIG. 2 is a timing chart of access operation of the conventional cache memory.
Figure 3:
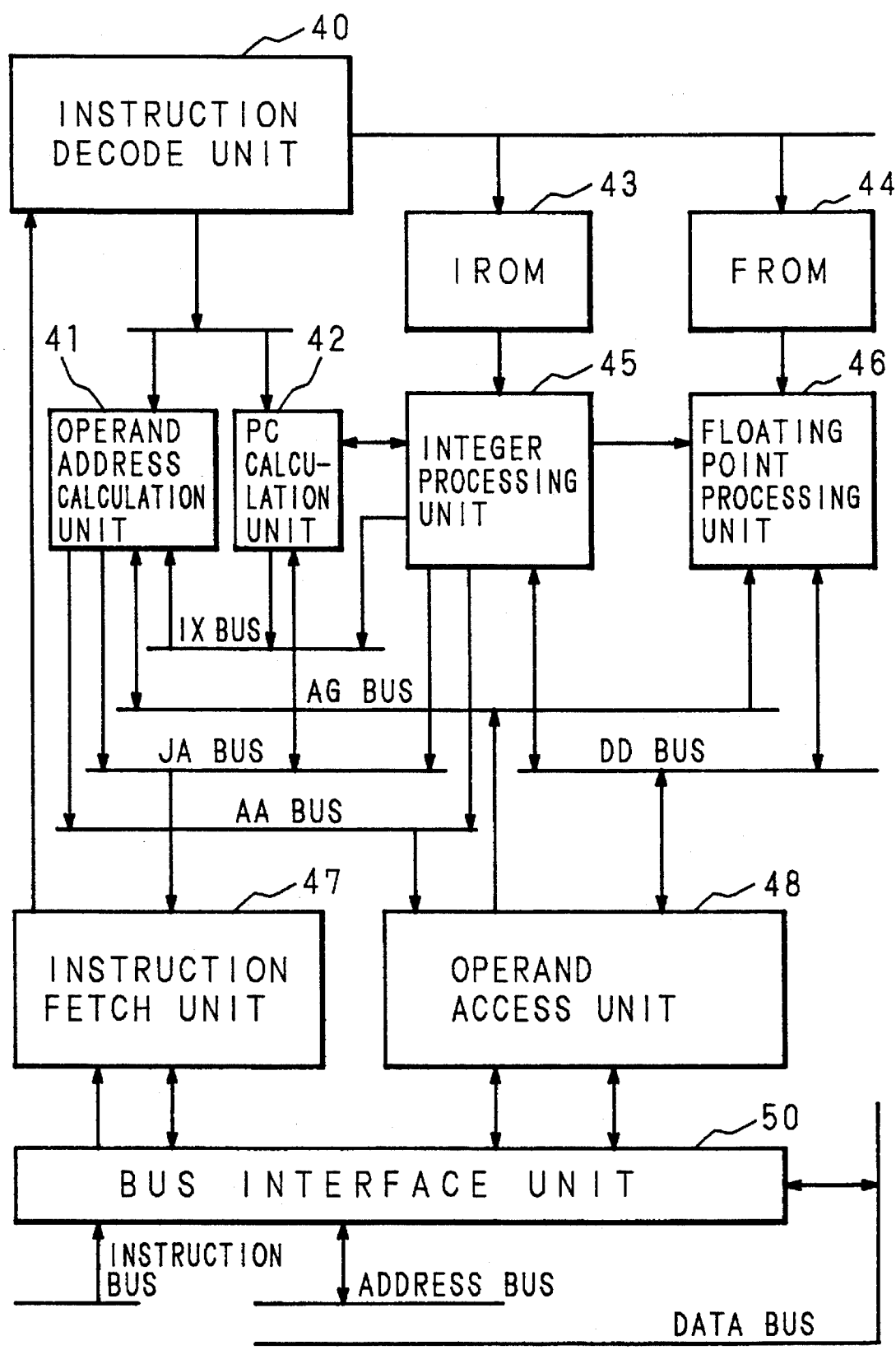
FIG. 3 is a block diagram of a microprocessor having a built-in cache memory in accordance with the present invention.

The following provides a, detailed description of the present invention based on drawings showing embodiments thereof. As shown in FIG. 3, this microprocessor consists of ten blocks when roughly divided, and these are an instruction fetch unit (IFU) 47, an instruction decode unit (DU) 40, a first micro-ROM unit (IROM) 43, a second micro-ROM unit (FROM) 44, an operand address calculation unit (AU) 41, a PC calculation unit (PCU) 12, an integer processing unit (IU) 45, a floating point processing unit (FPU) 46, and operand access unit (OAU) 48 and a bus interface unit (BIU) 30. The bus interface unit 50 controls input and output of data to and from an external memory using an instruction bus of 32 bits, a data bus of 64 bits and an address bus of 32 bits. Hereinafter, further detailed description is made on each block.

(1) Instruction Fetch Unit

The instruction fetch unit (IFU) 47 comprises an address translation unit for instruction address, a built-in instruction cache of 8K bytes, a Translation Lookaside Buffer (TLB) of 64 entries for instructions which translates logical address into a physical address, two instruction queues of 32 bytes, and a control unit. The instruction fetch unit 47 translates a logical address of the next instruction to be fetched into a physical address, and fetches an instruction code from the built-in instruction cache, and outputs it to the instruction decode unit 40. Also, when the built-in instruction cache has missed, the instruction fetch unit 47 outputs the physical address to an address input/output unit located inside the bus interface unit 50. The IFU requests an access to the external memory, fetches the instruction code through an instruction input unit located inside the bus interface unit 50, and registers it into the built-in instruction cache.

In the case of fetching an instruction code from the instruction bus, and in the case of fetching an instruction code by operating the data bus with a width of 32 bits, the instruction cache is operated with a configuration of 16 bytes×128 entries×4 ways. In the case of fetching an instruction code by operating the data bus with a width of 64 bits, the instruction cache is operated with a configuration of 32 bytes×128 entries×2 ways. The TLB takes a configuration of 16 entries×4 ways all the time, irrespective of the operation bus mode.

Among two instruction queues, one queue performs queuing by pre-fetching an instruction code following a conditional branch instruction, and the other performs queuing by pre-fetching an instruction code of a branch destination. The logical address of the instruction to be fetched is calculated by a dedicated counter. When a jump has taken place, the logical addresses of new instructions are transferred from the operand address calculation unit 41, the Program Counter (PC) calculation unit 42 and the integer processing unit 45 through a Jump Address (JA) bus.

When the TLB for instruction has missed, address translation and renewal of the TLB for instruction by means of paging are also performed by a control circuit located inside the instruction fetch unit 47.

Also, this microprocessor monitors the address on the address bus through the address input/output unit during bus-snooping operation, and invalidates an appropriate entry of the built-in instruction cache if necessary.

(2) Instruction Decode Unit

The instruction decode unit 40 decodes an instruction code basically in a unit of 16 bits (half word). This block comprises a first decoder decoding the first half of an operation code contained in the first half word (FHW), an addressing mode decoder decoding information specifying an addressing mode by operating simultaneously with the first decoder, and a second decoder which decodes the second half of the operation code by inputting the result of decode of the first decoder, and outputs an entry address of the micro-ROM.

The instruction decode unit 40 comprises a sub decoder which, in parallel with the main decoder, decodes an instruction following the instruction decoded by the main decoder, composed of the first decoder, the addressing mode decoder and the second decoder. The sub decoder can decode an inter-register operation instruction having no relation of data dependence to the instruction to be decoded by the main decoder. The instruction decoded by the sub decoder is executed underhand-wired control at the same time that the instruction decoded by the main decoder is executed under microprogram control. This microprocessor adopts a super scaler architecture in which hardware automatically selects an instruction which can be decoded by the sub decoder.

The instruction decode unit 40 also comprises a branch prediction mechanism performing branch prediction of conditional branch instructions, and a score boarding register for interlocking a pipeline by checking for data hazards in operand address calculations.

The instruction decode unit 40 decodes the instruction code outputted from the instruction fetch unit 47 on the basis of 0–8 bytes per one clock. Among the results of the decode unit 40 are information on operation in the integer processing unit 45, outputted to the IROM unit 43, information on operation in the floating point processing unit 46, outputted to the FROM unit 44, information on operand address calculation, outputted to the operand address calculation unit 41, and information on PC calculation, outputted to the PC calculation unit 42, respectively.

(3) IROM Unit

The IROM unit 43 comprises a micro-ROM storing various microprogram routines for controlling the integer processing unit 45, a micro-sequencer, a micro-instruction decoder and the like. A micro-instruction is read from the micro-ROM once per clock period, and one inter-register operation is performed by one microinstruction. Therefore, transfer, comparison, addition, subtraction, logical operation or the like instructions are completed in one clock period. In addition to sequence processing for executing the microprogram relating to instruction execution, the micro-sequencer also performs reception of exception, interruption and trap (these three are called EIT altogether) and sequence processing of the microprogram corresponding to each EIT.

Also inputted to the IROM unit 43 are an external interrupt not depending on the instruction code and a branch condition of the microprogram as a result of the execution of an integer operation.

(4) FROM Unit

The FROM unit 44 comprises a micro-ROM storing various microprogram routines for controlling the floating point processing unit 46, a micro-sequencer, a micro-instruction decoder and the like. A micro-instruction is read out once per clock period from the micro-ROM, and one floating point operation is completed by a minimum of two micro-instructions. In addition to sequence processing shown by the microprogram, the micro-sequencer also performs exception processing relating to a floating point operation. Where a non-masked floating point exception has been detected, the IROM unit 43 performs exception processing.

When a floating point operation instruction is decoded by the microinstruction decoder, the result the of decoding is outputted simultaneously to the IROM unit 43 and the FROM unit 44. In the initial micro-step, the integer processing unit 45 and the floating point processing unit 46 are both operated. However, the micro-sequencer of the FROM unit 44 and the micro-sequencer of the IROM unit 43 are controlled independently, and therefore in the second step and thereafter, the integer processing unit 45 and the floating point processing unit 46 are operated independently.

(5) Operand Address Calculation Unit

The operand address calculation unit 41 is hardwired-controlled by control information outputted from the addressing mode decoder of the instruction decode unit 40. In this block, address calculations of operands other than memory access for memory indirect addressing and calculation of a jump destination address of a jump instruction are performed. The indirect address fetched in memory indirect addressing is transferred from the operand access unit 48 to the operand address calculation unit 41 through an Address Generate (AG) bus.

The result of the calculation of an operand address is outputted to the integer processing unit 45. In the preceding jump processing, in the completion stage of the operand address calculation, the result of a jump destination address calculation is outputted to the instruction fetch unit 47 and the PC calculation unit 42 through the JA bus.

An immediate value operand is outputted to the integer processing unit 45 and the floating point processing unit 46. Higher-order 32 bits of a 64-bit immediate value are transferred through the AG bus. Values of a general-purpose register and a program counter which are required for address calculation are transferred from the integer processing unit 45 and the PC calculation unit 42 through an IX (Index) bus.

(6) PC Calculation Unit

The PC calculation unit 42 is hardwired-controlled by information on PC calculation outputted from the instruction decode unit 40, and calculates the PC value of an instruction. The microprocessor instruction is a variable-length instruction, and the length of an instruction can be determined only after decoding the instruction. The PC calculation unit 42 calculates the PC value of the next instruction by adding the length of the instruction outputted from the instruction decode unit 40 to the PC value of the instruction which is being decoded.

The result of calculations in the PC calculation unit 42 is outputted as the PC value of each instruction together with the result of the decoding of the instruction. The results flow on the pipeline simultaneously with the instruction.

In preceding branch processing in the instruction decode stage, the address of a preceding branch destination instruction is calculated. A jump instruction to an absolute address is also processed in the instruction decoding stage.

Also, the PC calculation unit 42 comprises a PC stack holding a copy of the PC value of a return destination from a subroutine pushed into the stack in executing a jump instruction to the subroutine. For a return instruction from the subroutine, the PCU performs destination return processing, producing the address of a return destination instruction by reading-out a return destination PC from the PC stack. The destination address of a jump by a preceding branch and a preceding return is transferred to the instruction fetch unit through the JA bus.

(7) Integer Processing Unit

The integer processing unit 45 is controlled by a microprogram stored in the micro-ROM of the IROM unit and executes operation required for realizing the function of each integer operation instruction using a register file and a processing unit located inside the integer processing unit 45. The register file comprises a general-purpose register and a working register. The processing unit is divided into a main processing unit comprising a main Arithmetic Logic Unit (ALU), a main barrel shifter, a priority encoder and the like and a sub processing unit comprising a sub-ALU and a sub-shifter. The main processing unit and the sub processing unit are coupled respectively to a register file by three buses.

The sub processing unit performs an operation of the instruction decoded by the subdecoder of the instruction decode unit 40, and can be controlled by a micro-program. By means of this function, the integer processing unit 45 executes a high-function instruction at high speed by simultaneously performing two operations and two data transfers between registers when executing the high-function instructions.

Where the operand to be operated on by an instruction is an address or an immediate value, the immediate value or the calculated address is inputted from the operand address calculation unit 41. Also, where the operand to be operated on by an instruction is data in a memory, the address calculated by the operand address calculation unit 41 is outputted to the operand access unit 48 through an AA bus, and an operand fetched from the built-in data cache or from the outside is inputted to the integer processing unit 45 through a DD bus.

When the built-in data cache or the external memory is required to be read out in operation, the address is outputted to the operand access unit 48 through the AA address bus under direction of the microprogram, and the target data is fetched from the DD data bus.

When the result of an operation is required to be stored in the built-in data cache of the present invention or the external memory, the address and the data are outputted to the operand access unit 48 through the AA bus and the DD bus under direction of the microprogram. At this time, in the PC calculation unit 42, the PC value of the instruction having performed the store operation is held in a latch corresponding to the storing buffer.

When the integer processing unit 45 obtains a new instruction address by performing an external interrupt, exception processing or the like, it outputs this address to the instruction fetch unit 47 and the PC calculation unit 42 through the JA bus.

(8) Floating Point Processing Unit

The floating point processing unit 46 is controlled by a microprogram stored in the micro-ROM of the FROM 44. The FPU executes operations required for realizing the function of each floating point operation instruction using a register file and a processing unit which are located inside the floating point processing unit 46. A multiplier located on the floating point processing unit 46, executes floating point multiplication at high speed, and also performs multiplication for an integer multiplication instruction.

The floating point processing unit 46 comprises a floating point operation mode control register FMC which sets the rounding processing method for a floating point operation, sets permission for detection of floating point operation exceptions, and provides a floating point operation status word FSW which consists of a flag for the result of a floating point operation and a status bit showing the status of the generation of a floating point exception.

Where the operand to be operated on by an instruction is an immediate value, the immediate value outputted from the operand address calculation unit 41 is transferred through a S1 bus (32 bits of lower order) and the AG bus (32 bits of higher order). Also where the operand to be operated on by an instruction is data in a memory, the address calculated by the operand address calculation unit 41 is outputted to the operand access unit 48 through the AA bus, and the operand fetched from the built-in cache or the external memory is transferred once from the DD bus to the integer processing unit 46, and is inputted to the floating point processing unit 46 through the S1 bus and an S2 bus.

When an operand is required to be stored in the built-in data cache or the external memory, the data is transferred to the integer processing unit 45 through a D1 bus and a D3 bus which direction of a microprogram, and the data is outputted from the integer processing unit 45 to the operand access unit 48 through the DD bus. In a storing operation, the floating point processing unit 46 and the integer processing unit 45 are operated in a cooperative manner. The address is outputted from the integer processing unit 45 to the operand access unit 48 through the AA bus, and the data is outputted from the floating point processing unit 46.

(9) Operand Access Unit

The operand access unit 48 comprises an address translation unit for operand address, an 8 KB built-in data cache of the present invention, a 64-entry TLB for data, a two-entry operand pre-fetch queue, a three-entry storing buffer and control units.

The configuration of the built-in data cache is 32×bytes× 64 entries×4 ways, and the configuration of the TLB is 16 entries×4 ways. In a data loading operation, a logical address of data to be loaded which is outputted from the operand address calculation unit 41 or the integer processing unit 45 is translated into a physical address. The data is fetched from the built-in data cache, and is outputted to the integer processing unit 45 and the floating point processing unit 46. Where the built-in data cache has missed, the physical address is outputted to an address input/output unit in the bus interface unit 50. A data access to the outside is requested, and the data inputted through an data input/output unit is registered into the built-in data cache.

In storing operation of data, a logical address of data to be stored which is outputted from the integer processing unit 45 is translated into a physical address, and the data outputted from the integer processing unit 45 and the floating poing processing unit 46 are stored in the built-in data cache. Also, the physical address is outputted to the address input/output unit, and the data is outputted from the data input/output unit to the outside through the storing buffer. The storing buffer controls the data to be stored, the address thereof, and the address of the instruction having performed a storing operation is a set. A storing operation in the storing buffer is controlled by a first-in, first-out control system.

Address translation and renewal of the TLB for data by means of paging in the case where the TLB for data has missed are also performed by an internal control circuit of the operand access unit 48. Also, a check is made for whether or not the memory access address enters the I/O area mapped in the memory.

During bus-snooping operation of the microprocessor, the entry of the built-in cache hit by the physical address inputted through the bus interface unit 50 is invalid.

(10) Bus Interface Unit

The bus interface unit 50 consists of an address input/ output unit, an instruction input unit and a data input/output unit. The address input/output unit outputs the addresses outputted from the instruction fetch unit 47 and the operand access unit 48 to the outside of the microprocessor. Output of the address is performed according to the bus protocol determined by the microprocessor. Control of the bus protocol is performed by an external bus control circuit located in the address input/output unit. The external bus control circuit also receives bus access exceptions and external interrupts.

An external device other than the microprocessor serves as a bus master. During bus-snooping operation of the microprocessor, the external device stores the address outputted to the address bus when a data write is executed, and transfers it to the instruction fetch unit 47 and the operand access unit 48. Address storing operation is performed when a bar DS signal is asserted on a data write cycle (clock-asynchronized, edge sense) and when a bar MS signal is asserted while a bar MREQ signal is asserted (clock-synchronized level sense).

The instruction input unit inputs instruction codes to the microprocessor from the instruction bus (or the data bus) on a 32-bit (or 64-bit) basis. The accessing method of the instruction cache includes a standard bus cycle fetching an instruction code of 32 bits (or 64 bits) only once for one address and a block transfer bus cycle fetching instruction codes of 32 bits (or 64 bits) consecutively four times for one address. The instruction input unit transfers the fetched instruction code to the instruction fetch unit 47.

The data input/output unit stores data from the data bus in an operand loading operation, and transfers it to the operand access unit 48. In an operand storing operation, it outputs the operand which was outputted from the operand access unit 48 to the data bus. The accessing method to the external memory such as the data cache includes a standard bus cycle accessing 64-bit data for one address and a block transfer bus cycle accessing 64 bit or 32 bit data consecutively four times for one address. In either case, the data input/output unit performs input and output of the data given and taken between the operand access unit 48 and the external memory.

In the following, a description of a pipelined processing mechanism of the microprocessor is provided. This microprocessor achieves high-performance operation by pipeline-processing an instruction by means of efficient accesses to various buffer memories and the memory using the instruction bus and the data bus. Hereinafter, a detailed description of the pipeline contents is provided.

Pipelined Mechanism

Figure 4:
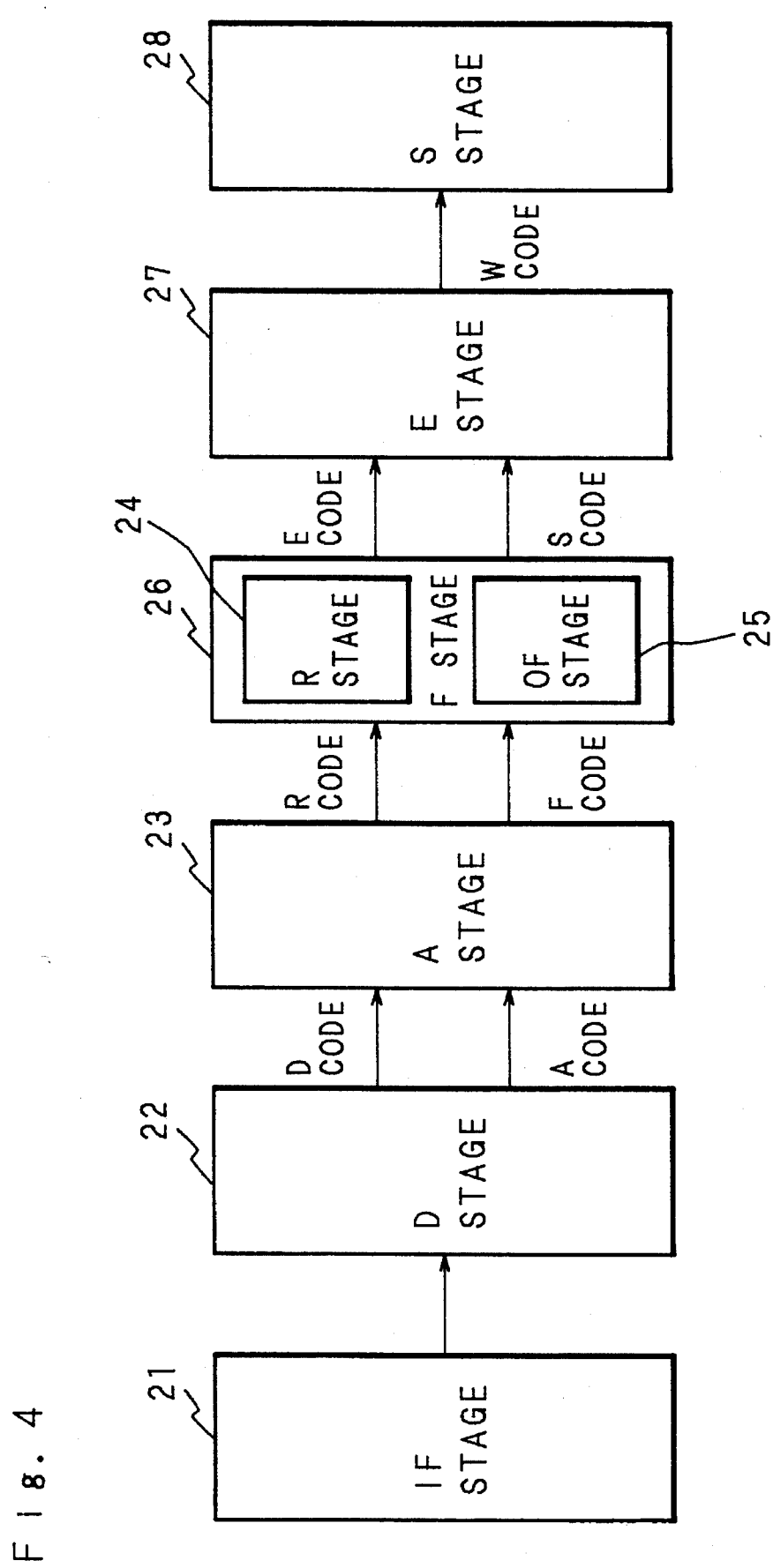
FIG. 4 is a block diagram of a pipelined mechanism of the microprocessor according to an embodiment of the present invention.

FIG. 4 show a pipeline diagram of a microprocessor. This mechanism performs pipelined processing configured in six stages; an instruction fetch stage (IF stage) 21 pre-fetching an instruction, a decode stage (D stage) 22 decoding the instruction, an operand address calculation stage (A stage) 23 performing address calculation of an operand, an operand fetch stage (F stage) 26 performing micro-ROM access (particularly called OF stage) 24 and pre-fetch of the operand (particularly called OF stage) 25, an execute stage (E stage) 27 executing the instruction, and a store stage (S stage) 28 storing the memory operand. The S stage 28 includes a three-stage storing buffer.

Each stage is operated independent of the other stages, and theoretically six stages perform perfectly independent operations. Each stage other than the S Stage 28 can perform one-time processing in a minimum of one clock period. The S stage 28 can perform one-time operand storing processing in a minimum of two-clock period. Accordingly, where storing of the memory operand is not performed, ideally pipelined processing s progress one after another on a clock basis.

This microprocessor contains instructions which cannot be executed by one-time basis pipelined processing alone such as inter-memory operation and memory indirect addressing, but the microprocessor is designed so as to be able to perform pipelined processing in as balanced a manner as possible also for these processings. For an instruction having a plurality of memory operands, pipelined processing is performed by decomposing the instruction into a plurality of pipelined processing units (step codes) in the decode stage based on the number of memory operands.

Information delivered from the IF stage 21 to the D stage 22 is an instruction code itself. Information delivered from the D stage 22 to the A stage 23 includes three items: an item relating to operation specified by an instruction (hereinafter referred to as D code), an item relating to address calculation of an operand (hereinafter referred to as A code) and a program counter value of the instruction under processing. Information delivered from the A stage 23 to the F stage 26 includes four items; an R code containing an entry address of a microprogram routine, parameters to the microprogram and the like, a F code containing the address of the operand, accessing method, directing information and the like, a program counter value and a stack pointer value of the instruction under processing. Information delivered from the F stage 26 to the E stage 27 incudes four items; an E code containing operation control information, literals and the like, an S code containing an operand, an operand address and the like, a program counter value and a stack pointer value of the instruction under processing. The S code consists of an address and data. Information delivered from the E stage 27 to the S stage 28 includes two items; a W code being the result of the operation, which is to be stored and a program counter value of the instruction outputting the result of operation. The W code consists of an address and data.

An EIT detected in a stage before the E stage 27 does not start EIT processing until the code thereof reaches the E stage 27. Only the instruction processed in the E stage 27 is an instruction of the execute stage, and the instructions under processing in the IF stage 21—the F stage 26 do not yet reach the execute stage. Accordingly, an EIT detected before the E stage 27 is delivered to the next stage with this detection recorded in the step code. An EIT detected in the S stage 28 is received when the instruction under processing in the E stage 27 is completed or received by canceling the processing of this instruction, and is returned to the E stage 27 to be processed.

Processing in Each Pipeline Stage

For convenience sake, a name is given to an input/output step code of each pipeline stage as shown in FIG. 4. Also, the step code performs processing relating to the operation code, and includes two series; a series becoming an entry address of the micro-ROM, parameters for the E stage 27 and the like, and a series becoming an operand to be processed in the E stage 27. Also, from the D stage 22 to the S stage 28, the program counter value of the instruction under processing is delivered, and from the A stage 23 to the E stage 27, the stack pointer value and the score board register value are delivered.

Instruction Fetch Stage

Figure 5:
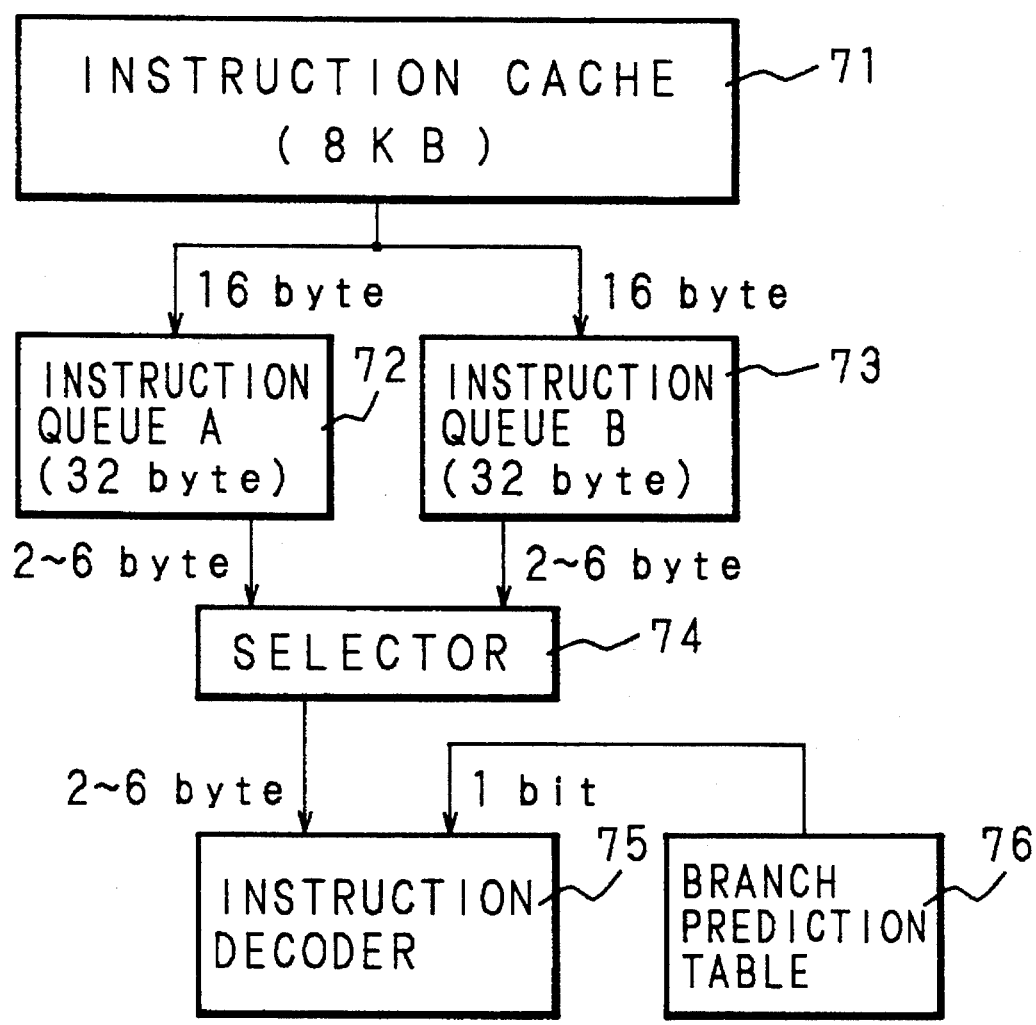
FIG. 5 is a block diagram showing a relationship between an F stage and a D stage of the pipelined microprocessor of FIG. 4.

In the instruction fetch stage (IF stage) 21, the instruction fetch unit 47 is operated. FIG. 5 is a block diagram showing a relationship between the F stage 21 and the D stage 22. The F stage fetches an instruction from a built-in instruction cache 71 or the outside, inputs it to one of two instruction queues A 72 and B 73, and outputs an instruction code in a unit of 2–6 bytes to the D stage 22.

Inputs of the instruction queues A 72 and B 73 are performed in a unit of 16 bytes arranged when the instruction cache 71 has hit, and in a unit of four bytes arranged when it has missed. The two instruction queues A 72 and B 73 are located to fetch both of an instruction following a conditional branch instruction and a branch destination instruction.

When fetching an instruction from the outside in the standard access mode, a minimum of two clocks are required for 4 bytes arranged. In the burst mode, a minimum of five clocks are required for 16 bytes. When the instruction cache 71 has hit, an instruction is fetched in one clock period for 16 bytes arranged. The unit of output of the instruction queues A 72 and B 73 is variable on a two types basis, and a maximum of six bytes can be outputted during one clock period.

Translation of the logical address of an instruction into the physical address, control of the instruction cache 71 and the TLB for instruction, management of the pre-fetch destination instruction address and control of the instruction queues A 72 and B 73 are also performed in the IF stage 21.

Instruction Decode Stage

The instruction decode stage (D stage) 22 decodes an instruction code inputted from the IF stage 21. Decoding is performed once per clock cycle by using an instruction decoder 75 such as a FHW (First Half Word) decoder, a NFHW (Not First Half Word) decoder, an addressing mode decoder or the like of the instruction decode unit 40, and an instruction code of 0–six bytes is consumed in one-time decode processing (no instruction code is consumed in output processing or the like of the step code containing the return address of the return subroutine instruction). An A code, containing address calculation information and a D code, containing being an intermediate result of decode of the operation code are outputted to the A stage 23 by a one-time decode.

In the D stage 22, control of the PC calculation unit 42 for each instruction and output processing of an instruction code from the instruction queues 72 and 73 are also performed.

In the D stage 22, preceding jump instruction processing (D stage preceding jump) is performed for a jump instruction. The D code and the A code are not outputted in the case of a jump instruction having performed a preceding jump, except for a conditional branch instruction. Processing of the instruction is completed in the D stage 22.

When a conditional branch instruction has been decoded, in the D stage 22, the IF stage 21 is directed to fetch instructions from both of the branch destination and the non-branch destination. The instruction to be decoded following the conditional branch instruction is determined according to the result of branch prediction. This means that when the conditional branch instruction is predicted to cause a branch, the instruction outputted from the instruction queue A 72, fetching the instruction of the branch destination is decoded, when the conditional instruction is predicted not to branch, the instruction code outputted from the instruction queue B 73 fetching the non-branch destination instruction is decoded.

Operand Address Calculation Stage

The operand address calculation stage (A stage) 23, is divided roughly into two processings. One is a processing performing latter-stage decode of an operation code by using the decoder 76 of the instruction decode unit 40, and the other is a processing performing calculation of an operand address in the operand address calculation unit 41.

The latter-stage decode processing of the operation code inputs the D code, and performs write reservation to a register or a memory and output of a R code containing an entry address of a microprogram routine, parameters for the microprogram and the like. The write reservation to a register or a memory is to prevent the content of the register or the memory referred in address calculation from being rewritten by the preceding instruction on the pipeline such that a wrong calculation is performed.

The operand address calculation processing inputs the A code, performs address calculation of an operand in the operand address calculation unit 41 according to the A code, and outputs the result of the calculation as an F code. Also, for a jump instruction, it performs calculation of the jump destination address. It makes a check for write reservation in reading out the register being attended with address calculation, and when it determines that a reservation is present because the preceding instruction has not completed write processing to the register or the memory, it waits until the preceding instruction completes the write processing in the E stage 27.

In the A stage 23, a preceding jump processing (A stage preceding jump) is performed for a jump instruction which has not performed a preceding jump in the D stage 22. For a register indirect jump and a memory indirect jump, the A stage preceding jump is performed. For an instruction which has performed an A stage preceding jump, the R code and the F code are not outputted, and the processing of the instruction is completed in the A stage 23.

Micro-ROM Access Stage

The operand fetch stage (F stage) 26 is also divided roughly into two processings. One is an access processing of the micro-ROM, particularly being called the R stage 24. The other is an operand prefetch processing, particularly being called the OF stage 25. The R stage 24 and OF stage 25 are not always operated simultaneously, and their operational timings differ depending on miss or hit of the data cache, miss or hit of the data TLB or the like.

The micro-ROM access processing which occurs in the R stage 24 is a micro-ROM access and a microinstruction decode processing for producing an E code which is an execute control code to be used for execution in the next E stage 27 for the code $.

Where processing for one R code is decomposed into two or more microprogram steps, the IROM unit 43 and the FROM unit 44 are used in the E stage 27, and the next R code is sometimes put in a micro-ROM-access-wait state. A micro-ROM access for the R code is performed when no micro-ROM access in the E stage 27 is performed. In the microprocessor, a number of integer operation instructions are performed in one microprogram step, and a number of floating point operation instructions are performed in two microprogram steps. Therefore, micro-ROM accesses for the R coded are often performed one after another.

In the processing of the R stage 24, only the IROM unit 43 is accessed for an instruction not using the floating point processing unit 46, and the FROM unit 44 is not accessed. The IROM unit 43 and the FROM unit 44 are both accessed for an instruction using the floating point processing unit 46 (floating point operation instruction, integer multiply/divide instruction or the like).

Operand Fetch Stage

The operand fetch stage (OF stage) 25 performs operand pre-fetch processing among the above-mentioned two processings to be performed in the F stage 26.

In the operand fetch stage 25, the logical address of the F code is translated into a physical address by the data TLB, the built-in data cache is accessed by the physical address, an operand is fetched, and the operand and the logical address transferred as an F code are combined and outputted as a S code.

In one F code an 8-byte boundary may be crossed, but an operand fetch of eight bytes or less is specified. The F code specifies of whether or not access of the operand is to be performed. Where the operand address itself and the immediate value which have been calculated in the A stage 23 are transferred to the E stage 27, no operand pre-fetch is performed, and the content of the F code is transferred as an S code.

Execution Stage

The execution stage (E stage) 27 is operated with the E code and the S code taken as input. The E stage 27 executes an instruction, and the processings performed in the stages before the F stage 26 are all processings for the E stage 27. When a jump is executed or a EIT processing is started in the E stage 27, processings in the IF stage 21 through the E stage 27 are all invalid. The E stage 27 is controlled by a microprogram, and an instruction is executed by executing a series of micro-instructions from the entry address of a microprogram routine contained in the R code.

An E code includes a code controlling the integer processing unit 45 (particularly called EI code) and a code controlling the floating point processing unit 46 (particularly called EF code). The EI code and the EF code can be outputted independently. At this time, in the E stage 27, the integer processing unit 45 and the floating point processing unit 46 are operated in parallel. For example, where a floating point operation instruction having no memory operand is executed in the floating point processing unit 46, the floating point processing unit 46 is separated from the integer processing unit 45 starting with the operation of the second microstep, and performs parallel operation independent of the integer processing unit 45. In addition, the integer processing unit 45 executes a minimum of one micro-instruction for all instructions containing a floating point operation instruction. (Even in the case of a floating point operation instruction, the integer processing unit 45 is always operated in the initial one clock period).

In both of the integer operation and the floating point operation, read-out of the micro-ROM and execution of the micro-instructions are performed in a pipelined manner. Accordingly, when a branch takes place in a microprogram, space of one microstep is produced. In the E stage 27, the write reservations to the register and the memory which have been made in the A stage 23 are canceled after writing the operand.

Various interrupts are directly received at breaks between instructions in the E stage 27, and required processings are executed by a microprogram. Other processings of various EITs are also performed in the E stage 27 by the microprogram.

When the result of an operation is required to be stored in the memory, the E stage 27 outputs two items to the stage 28; a W code and a program counter value of the instruction performing store processing. Operand store into the memory is performed in a sequence specified logically by the program irrespective of the result of integer operation and the result of floating point operation. When data is stored into the memory from the floating point processing unit 46, the integer processing unit 45 does not execute subsequent instructions until the instruction is completed (until the instruction moves to the store stage).

Operand Store Stage

The operand store stage (S Stage) 28 translates the logical address of the W code into a physical address by the data TLB, and stores data specified in the W code in the built-in data cache by that address. At the same time it inputs the W code and the program counter value to the storing buffer, and performs processing of storing the data of the W code in the external memory by using the physical address outputted from the data TLB.

The operation of the operand store stage 28 is performed in the operand access unit 48, and address translation processing and replacement processing of the built-in data cache are also performed when the data TLB or the built-in data cache has missed.

Where an EIT has been detected in the store processing of the operand, the E stage 27 is informed of the EIT, with the W code and program counter value held in the storing buffer.

Status Control of Pipeline Stage

Each stage of the pipeline has an input latch and an output latch, and is based on operating independent of other stages. In each stage, when the processing performed just before is completed, and the result of the processing is transferred from the output latch to the input latch of the next stage, and all of input signals required for the next processing are prepared in the input latch of each stage itself, the next processing is started.

This means that in each stage, all input signals for the next processing which are outputted from the preceding stage are valid, and the present result of processing is transferred to the input latch of the latter stage and the output latch becomes vacant. Then the next processing is started.

It is required that all of input signals are prepared at a time immediately before each stage starts operation. When all the input signals are not prepared, that stage is put in a wait state (wait for input). When a transfer from the output latch to the input latch of the next stage is performed, the input latch of the next stage is required to be in a vacant state, and when the input latch of the next stage is not vacant, the pipeline stage is also put in a wait state (wait for output). Also, when the cache or the TLB has missed or a data interference takes pace between instructions under processing in the pipeline, a plurality of clock periods are required for processing in one stage, and thereby the pipelined processing is delayed.

In this microprocessor, in addition to the basic pipelined processing as mentioned above, a super scaler architecture is adopted which simultaneously decodes and simultaneously executes two instructions in some cases such as the case where two integer operation instructions between registers continue. To realize this function, this microprocessor is provided with a main instruction decoder and a sub instruction decoder in the instruction decode unit 40, and is provided with a main processing unit and a sub processing unit in the instruction execute unit. The register of the integer processing unit 45 and the two processing units are coupled respectively by three buses.

Figure 6:
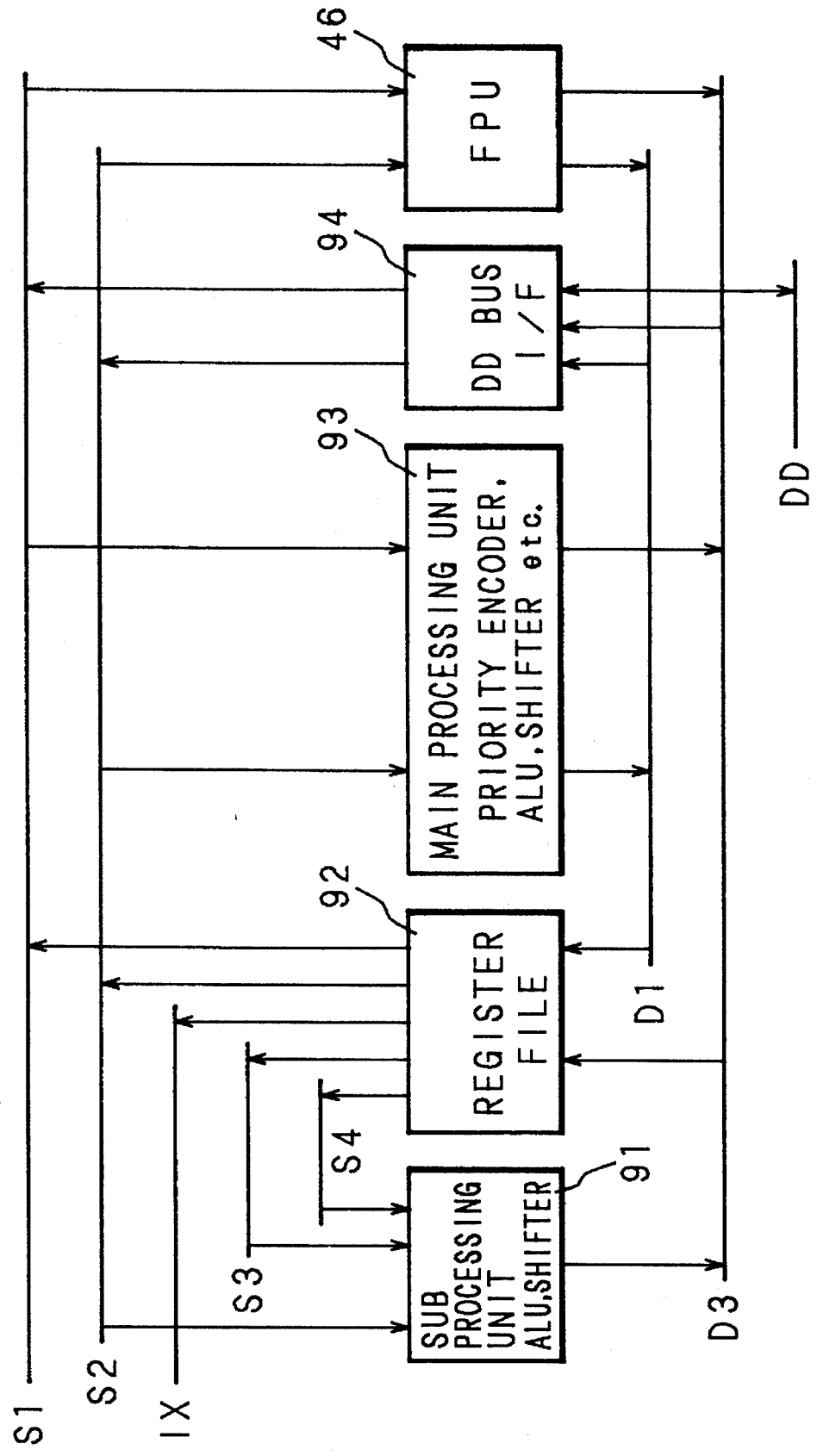
FIG. 6 is a block diagram showing a connective relation between an integer processing unit and a floating point processing unit.

FIG. 6 is a block diagram showing a relation of bus coupling the registers with the processing units of the integer processing unit 45 of the microprocessor and further a relation of connection between the integer processing unit 45 and the floating point processing unit 46. Each of buses S1, S2, S3, S4, D1, D3 and IX has 32 bits and a bus DD has 64 bits. The main processing unit 93 fetches data from a register file 92 through the S1 bus and the S2 bus, and writes back the result of operation through the D1 bus. The sub processing unit 91 fetches data from a register file 92 through the S3 bus and the S4 bus, and writes back the result of operation through the D3 bus. When data is communicated between the integer processing unit 45 and the floating point processing unit (FPU) 46, two of the S1 bus and the S2 bus and two of the D1 bus and the D3 bus are coupled respectively, being operated as buses of 64 bits.

Next, a detailed description is provided of blocks relating to the data cache of the microprocessor.

Figure 7:
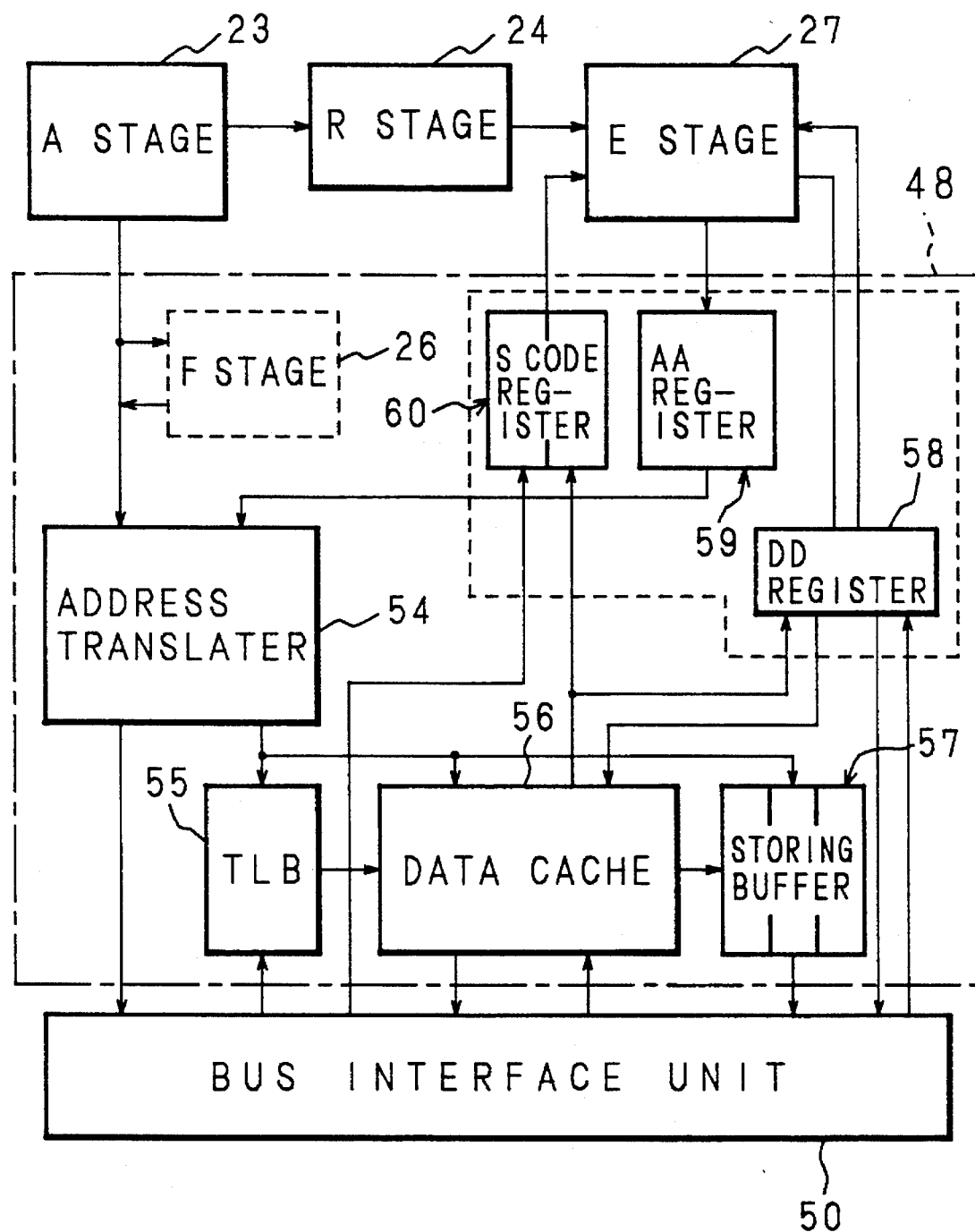
FIG. 7 is a block diagram showing a configuration of an operand access unit of the pipelined microprocessor of FIG. 4.

FIG. 7 is a block diagram showing a configuration of the operand access unit (hereinafter referred to as OAU) 48 of the microprocessor. The OAU 48 receives access requests from the operand address calculation stage 25 and the E stage 27, and starts processing. The access request to be sent from the operand address calculation unit 41 to the OAU 48 includes two kinds; one is an operand fetch request and the other is an indirect reference to the external memory for address production. Requests for fetch and store of operands also comes from the E stage 27. In this case, the address is stored in an AA register 59, to be sent therefrom to an address translater 54.

The following describes a processing sequence of the OAU 48 when receiving an access request from the address calculation stage. When the OAU 48 detects an access request from the address calculation stage 23, it stores the logical address if the F stage 26, acting as buffer storing the address for operand fetch, can receive the request even when the OAU 48 is performing the preceding processing. Then, it receives a request from the F stage 26 after the preceding processing has been completed.

The logical address sent to the address translator 54 in this manner is first referred to the TLB 55, and where the TLB has hit, a physical address is generated, the physical address is outputted to the data cache 56. Where the TLB 55 has missed, in the address translater 54 an external bus access request for referring to an address translation table on the external memory is outputted to the bus interface unit 50. Then, the reference to the address translation table is completed, and the generated physical addresses is outputted to the data cache 56.

When the data cache 56 has hit, the data read out from the data cache 56 is registered into a S code register 60, acting as an operand pre-fetch queue. The E stage 27 reads an operand from the S code register 60, and performs processing. When a cache miss has taken place, a register request for the block having missed is sent to the bus interface unit 50, and the data stored from the outside is inputted to the data cache 56, being inputting also to the S code register 60.

The following describes a processing sequence in the case where a store request is sent from the E stage 27. The E stage 27 writes store data to a DD register 58, writes a store address to the AA register 59, and outputs an access request. When the access request is received by the OAU 48, the address translator 54, the TLB 55 and the data cache 56 are operated like the processing sequence after receiving an access from the above mentioned address calculation stage 29. However, in the case of store processing, when the data cache 56 has hit, then store data must be written to the data cache 56. When the data cache 56 has missed, nothing is performed.

The data cache 56 of the microprocessor uses a write-through system, and the data is required to be written also to the external memory. In general, the external bus cycle is slower than the machine cycle of the microprocessor, and therefore a storing buffer 57 is installed to prevent the internal processing from being speed-regulated by external bus access. The storing buffer 57 has three entries, and even when store data sent from the E stage 27 strides over a word boundary, the data can be registered into the storing buffer 57 in one time.

Figure 8:
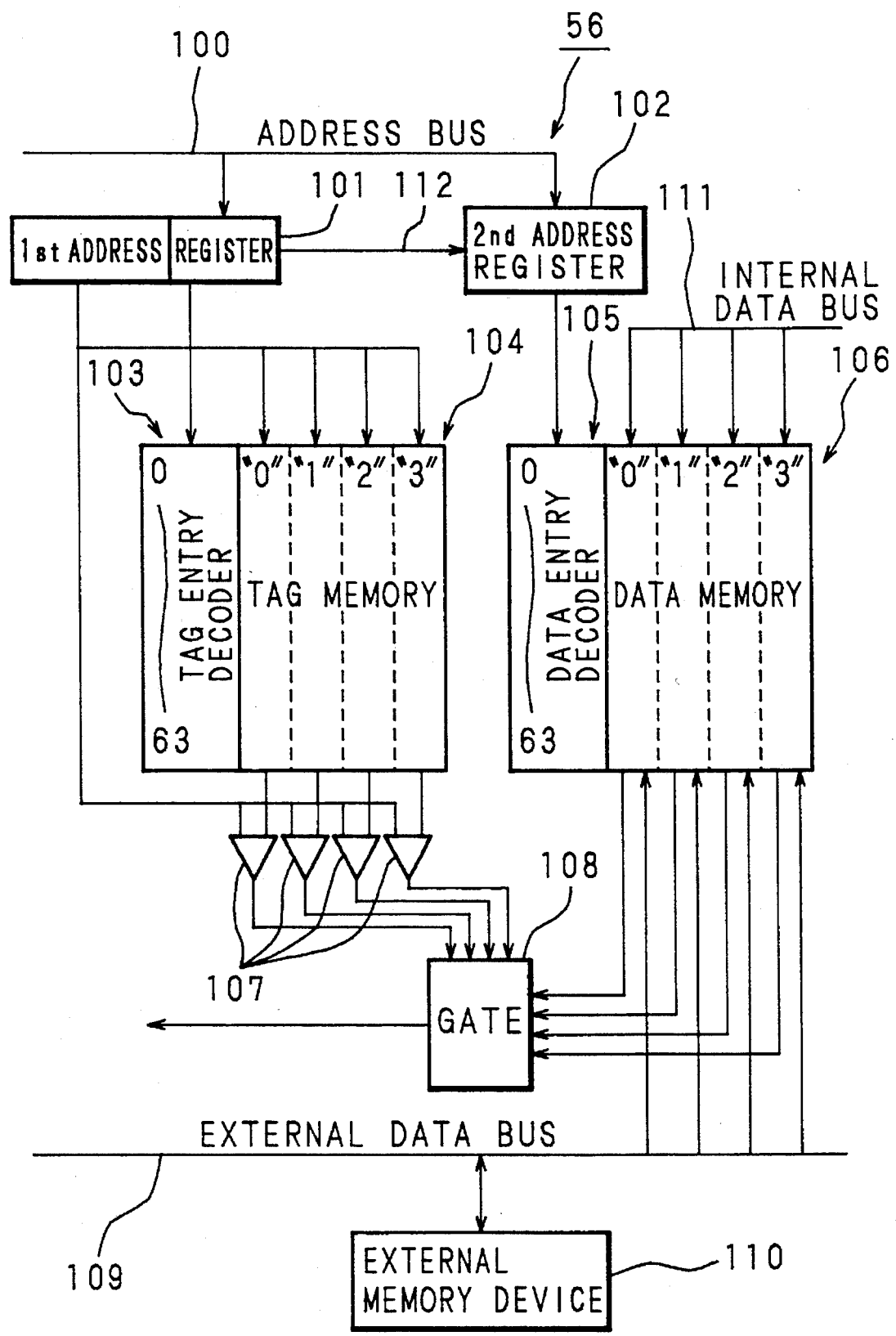
FIG. 8 is a block diagram showing a configuration of a data cache which is the cache memory of the present invention.

FIG. 8 is a block diagram showing a configuration of the data cache 56 of the present invention. This data cache 56 is operated in a four-way set associative system of 0th-3rd way, and the number of entries of each way is 64. The data cache 56 is composed of a first address register 101 temporarily storing an address given through the address bus, a second address register 102 temporarily storing part (six bits of lower order) of the address, a transferring path 112 connecting the first address register 101 and the second address register 102, a tag entry decoder 103 which decodes six bits of lower order of the address and selects an entry of a tag memory 104, the tag memory 104, a data entry decoder 105 selecting an entry of a data memory 106, the data memory 106, a comparator 107 and a gate 108.

Where reading data from an external memory 110 is performed as a result of processing an instruction, the address of the data to be read is sent to the data cache 56 through an address bus 100, and the total bit width of the address (32 bits) is stored in the first address register 101 for the tag memory 104. The six lower order address bits are stored in the second address register 102 for data. Then, the six lower order address bits of the first and the second address register 101 and 102 are sent respectively to the tag entry decoder 103 for the tag memory 104 and to the data entry decoder 105 for the data memory 106, and a signal for selecting any of 64 entries is generated.

Next, in the tag memory 104, four tags are read out from the selected entry, and the comparator 107 compares the four tags with higher-order bits excluding the above-mentioned six lower order bits of the first address register 101. The corresponding data read out from the data memory 106 is selected by the gate 108, and the data is outputted to the processing unit. Where data is read out from the data cache 56 in such a manner, the tag- and entry-decoders 103 and 105 perform identical operations.

The following provides a description of writing data to the external memory 110 as a result of processing an instruction. In the case of write processing, an address sent through the address bus 100 is stored only into the first address register 101. Then, like read processing, retrieval of the tag memory 104 is performed. When the data read out from the tag memory 104 and the higher-order bits of the first address register 101 coincide with each other, six bits of lower order of the first address register 101 are transferred to the second address register 102. If an address for write processing is sent in the next request, the address is stored into the fist address register 101.

Next, in the data memory 106, the transferred lower-order address is decoded by the data entry decoder 105, and a signal for selecting any of 64 entries is generated. Then, based on the way information of the tag memory 104, data is written to the corresponding data memory 106 from an internal data bus 111. On the other hand, the tag memory 104 performs a retrieval of an address corresponding to the next write processing, and when they coincide with each other, six lower order bits of the first address register 101 are transferred to the second address register 102 like the above case.

FIG. 9 shows a timing chart of the microprocessor having the built-in data cache 56 of the present invention. FIG. 9 shows the case where a first operation is a read, and the second to fourth operations are writes. First, the first operation is a read, and therefore the address thereof is written simultaneously to the first address register 101 for the tag memory 104 and the second address register 102 for the data memory 106.

Then, a write processing comes next, and therefore the address is written only to the first address register 101 for the tag memory 104, and is not written to the second address register 102 for the data memory 106. Then, when the address of write has coincided with the tag information (cache hit), the address is transferred to the second address register 102. At this time, when it is a cache miss, write to the data memory 106 of the data cache 56 is not required, and therefore the address of the next read processing can also be stored into the first address register 101 and the second address register 102. The above processing enables the cache to make a cache access overlap in one clock period for consecutive writes in a cache hit or miss and for a read following a write at a cache miss.

Also, the entry decoders 103 and 105 are provided independently for the tag memory 104 and the data memory 106, and therefore a bus snooping operation can also be performed in parallel with a cache write. In a case where the microprocessor is connected to another microprocessor on an external bus, and accesses a common external memory (main memory), coherency of the respective data caches 56 is required to be held, and in the case where the other microprocessor renews the main memory, the block of the data cache 56 having the area must be invalid. For this reason, the first address register 101 for the tag memory 104 must have a function of inputting an address from the inside, and monitoring and storing an external address. In this microprocessor, in such a case, even if the first address register 101 and the tag entry decoder 103 are used for bus snooping, a write to the data memory 106 for write can be executed simultaneously because of the data memory 106 is provided with another set of the second address register 102 and the data entry decoder 105.

As described above, in the present invention, the address registers and the entry decoders are installed separately for tag and for data, and part of the store address of the first address register can be transferred to the second address register in a write operation. Therefore, tag comparison and data write operation can be processed in parallel (overlap), and thereby write operations can be processed consecutively. Accordingly, in the case where write operations are made consecutively, they can be processed in one clock period, and thereby can be processed without delay in the same time as the operation processing of the microprocessor. Thereby the cache memory and the microprocessor can be operated at high speed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A cache memory apparatus comprising
   a data memory storing a plurality of data information words, at least one of said data information words being identical to a word stored in a main memory at a store address of said main memory,
   a tag memory different from said data memory storing tag information words containing at least portions of said store address,
   a first address register storing first information comprising said store address,
   a path for transferring second information to a second address register, wherein said second information contains at least a portion of said store address,
   a first entry decoder, connected to said path for transferring, which decodes said second information and selects an entry of said tag memory to define a selected entry,
   a second entry decoder, different from said first entry decoder, which decodes the contents of said second address register, and selects an entry of said data memory, and
   a comparator which compares third information comprising tag information stored in the selected entry of said tag memory with fourth information comprising that part of the store address which does not include the store address decoded by the first entry decoder, wherein when an instruction to write information to said main memory is executed, said first address register stores said store address, and when said comparing means has detected that said third information matches said fourth information, said second information is transferred to said second address register through said path.

2. A cache memory apparatus as set forth in claim 1, wherein said tag memory and data memory respectively have four information words which are selected in response to selection of said selected entry.

3. A cache memory apparatus as set forth in claim 2, wherein said comparing means performs said comparison on each of said four information words in said tag memory.

4. A cache memory apparatus as set forth in claim 1, wherein said first address register stores a store address of 32-bit length, and transfers six lower order bits thereof to said second address register through said path.

5. A microprocessor integrated in one chip comprising,
   a pipelined processing mechanism for executing a plurality of instructions in parallel,
   an instruction decode unit decoding said plurality of instructions to provide a plurality of decoded instructions,
   a logical processing unit performing an operation responding to said plurality of decoded instructions,
   a bus interface unit which controls an external memory storing a plurality of data containing said instructions, and input and output of said plurality of data,
   a data memory storing a plurality of data information words, at least one of said information words being identical to a word stored in said external memory,
   a tag memory different from said data memory storing tag information words containing at least portions of said store address,
   a first address register storing first information comprising said store address,
   a second address register storing second information, said second information being at least part of said store address,
   a path for transferring said second information to a first entry decoder which decodes said second information and selects an entry of said tag memory, to define a selected entry,
   a second entry decoder, different from said first entry decoder, which decodes the contents of said second address register and selects an entry of said data memory, and
   a comparator which compares third information comprising the tag information stored in the selected entry of said tag memory with fourth information comprising that part of the store address which does not include the store address decoded by said first entry decoder, wherein, when an instruction to write information to said external memory is executed, said first address register stores said store address, and when said comparing means has detected that said information matches said fourth information, the second information is transferred to said second address register through said path.

6. A microprocessor as set forth in claim 5, wherein said first address register has a path for storing said write store address when an external apparatus executes a write instruction to said external memory.

7. A method for storing data in a cache memory in a computer with a pipeline processor during first and second consecutive clock periods, said cache memory coupled to the pipeline processor by an address bus and a data bus, said computer having a main memory for storing words at a plurality of memory addresses, each of said plurality of memory addresses of said main memory consisting of a first portion and a second portion, said first portion consisting of a predetermined number of the most significant bits and said second portion consisting of a predetermined number of the least significant bits, said cache memory including a data memory for storing a plurality of data words at a plurality of data cache addresses, each of said plurality of data words being identical to a word stored in said main memory, said cache memory having a tag memory for storing a plurality of tag words at a plurality of tag addresses, each of said plurality of tag words being identical to said first portion of one of said plurality of memory addresses of said main memory, said cache memory having a first address register, the method comprising:

coupling said first address register to a second address register;

coupling said first address register to a first decoder, said first decoder being coupled to said tag memory;

coupling said second address register to a second decoder, said second decoder being coupled to said data memory;

coupling said tag memory to a comparator;

receiving a first memory address in said first address register from said address bus, said first memory address being one of said plurality of said memory addresses;

transmitting said first portion of said first memory address to said comparator;

transmitting said second portion of said first memory address to said first decoder;

transmitting said second portion of said first memory address to said second address register;

decoding said second portion of said first memory address to provide a tag address during said first clock period;

transmitting a first tag word stored in said tag memory at said tag address to said comparator during said first clock period;

comparing, in said comparator, said first tag word with said first portion of said first memory address and outputting a first indication indicating whether said first tag word is identical with said first portion of said first memory address;

decoding the contents of said second address register to provide a first data cache address during said second clock period;

storing data received on said data bus into said data memory at said first data cache address during said second clock period when said first indication indicates that said first tag word is identical with said first portion of said first memory address;

receiving a second memory address in said first address register from said address bus during said second clock period, said first memory address being one of said plurality of said memory addresses;

transmitting said first portion of said second memory address to said comparator;

transmitting said second portion of said second memory address to said first decoder.

8. A cache memory apparatus comprising:

a data memory means for storing a plurality of data words, at least one of said data words being identical to a word stored in a main memory at a store address of said main memory;

a tag memory means for storing tag words, at least one of said tag words containing at least portions of said store address;

a first address register means for storing first information comprising said store address;

a second address register means for storing second information, said second information being at least part of said store address;

path means for transferring said second information to said second address register;

first decoder means for decoding said second information and selecting an entry of said tag memory to provide a selected tag entry;

second decoder means, different from said first decoder means, for decoding the contents of said second address register and selecting an entry of said data memory to provide a selected data entry;

comparing means for comparing third information, comprising tag information stored in said selected tag entry of said tag memory, with fourth information comprising that part of the store address which does not include the store address decoded by said first decoder means;

gate means for permitting writing of information to said data memory at said selected data entry when said comparing means has detected that said third information matches said fourth information; and means for storing information, different from said first information, in said first address register substantially simultaneously with writing of information to said data memory at said selected data entry.

9. A cache memory apparatus comprising:

a data memory storing a plurality of data information words, at least one of said data information words being identical to a word stored in a main memory at a store address of said main memory, a tag memory different from said data memory storing tag information words containing at least portions of said store address, a first address register storing first information comprising said store address, said first address register stores a store address having a 32-bit length, a path for transferring second information to a second address register, wherein said second information contains at least a portion of said store address and includes six lower order bits of said 32-bit length of said store address, a first entry decoder, connected to said path for transferring, which decodes said second information and selects an entry of said tag memory to define a selected entry, a second entry decoder, different from said first entry decoder, which decodes the contents of said second address register, and selects an entry of said data memory, and a comparator which compares third information comprising tag information stored in the selected entry of said tag memory with fourth information comprising that part of the store address which does not include the store address decoded by the first entry decoder, wherein when an instruction to write information to said main memory is executed, said first address register stores said store address, and when said comparing means has detected that said third information matches said fourth information, said second information is transferred to said second address register through said path.

10. The method of claim 7 further comprising the steps of:

performing a bus snooping operation on said first address register and said first decoder, wherein said step of performing a bus snooping occurs substantially simultaneously with said step of storing data into said data memory.

* * * * *